(12) United States Patent
Wang

(10) Patent No.: US 9,133,948 B2
(45) Date of Patent: Sep. 15, 2015

(54) WATER FLOW CONTROLLING DEVICE FOR FAUCET

(71) Applicant: Hsiang Hung Wang, Changhua Hsien (TW)

(72) Inventor: Hsiang Hung Wang, Changhua Hsien (TW)

( * ) Notice: Subject to any disclaimer, the term of this patent is extended or adjusted under 35 U.S.C. 154(b) by 138 days.

(21) Appl. No.: 14/070,713

(22) Filed: Nov. 4, 2013

(65) Prior Publication Data

US 2015/0122346 A1    May 7, 2015

(51) Int. Cl.
*F16K 43/00* (2006.01)
*F16K 11/00* (2006.01)
*F16K 31/06* (2006.01)
*G05D 11/16* (2006.01)
*G05D 11/13* (2006.01)

(52) U.S. Cl.
CPC .......... *F16K 19/006* (2013.01); *F16K 11/00* (2013.01); *F16K 31/0603* (2013.01); *G05D 11/132* (2013.01); *G05D 11/16* (2013.01)

(58) Field of Classification Search
CPC .............................. F16K 11/00; F16K 19/006

USPC ........... 137/315.12, 454.6, 603, 614.05, 801; 4/676, 677, 695

See application file for complete search history.

(56) References Cited

U.S. PATENT DOCUMENTS

| 4,147,631 | A | 4/1979 | Deines et al. |
| 4,172,796 | A | 10/1979 | Corder |
| 6,321,777 | B1 * | 11/2001 | Wu ........................... 137/315.12 |
| 7,182,100 | B2 * | 2/2007 | Pinette ....................... 137/625.4 |
| 7,445,024 | B2 * | 11/2008 | Paterson et al. .............. 137/606 |
| 2003/0121553 | A1 * | 7/2003 | Kuo Liao ................. 137/625.47 |

* cited by examiner

*Primary Examiner* — Craig Schneider
*Assistant Examiner* — Reinaldo Sanchez-Medina
(74) *Attorney, Agent, or Firm* — Charles E. Baxley

(57) ABSTRACT

A water flow controlling device for a faucet includes a controlling mechanism having a housing and a casing disposed on a bottom wall and having compartment and chamber communicating with each other, a valve seat formed in the casing, a check valve device engaged in the casing for engaging with the valve seat and for controlling the water to flow out of the casing, a receptacle includes a chamber for engaging with the housing and the casing and the bottom wall of the controlling mechanism, and an actuator tube is attached to the receptacle and includes a protrusion for disengaging the check valve device from the valve seat of the casing when the receptacle is engaged onto the casing.

4 Claims, 6 Drawing Sheets

WATER FLOW CONTROLLING DEVICE FOR FAUCET

BACKGROUND OF THE INVENTION

1. Field of the Invention

The present invention relates to a water flow controller or controlling device for a faucet assembly, and more particularly to a water flow controlling device for automatically closing or shutting off a faucet device or for shutting off the water when an outer housing or receptacle of the faucet device is removed or disengaged or separated from the water mixing or controlling mechanism of the faucet device.

2. Description of the Prior Art

Typical water flow controlling devices for faucets comprise a control mechanism for automatically controlling a faucet to deliver the water for a predetermined time interval and for flushing or cleaning purposes; or for mixing the cold and hot water to provide a mixed water with a suitable mixing temperature and for preventing the users from being hurt by the hot water.

For example, U.S. Pat. No. 4,147,631 to Deines et al., and U.S. Pat. No. 4,172,796 to Corder disclose two of the typical fluid flow controlling devices including a complicated structure for controlling the faucet to mix or blend the cold and hot water to provide a mixed water with a suitable mixing temperature, and to supply or deliver the water out through an outlet nozzle or outlet port or the like.

However, normally, the typical fluid flow controlling devices for the faucet devices comprise a complicated structure that may not be easily fixed or repaired. For example, the cold and hot water supplied lines from the cold and hot water reservoir to the typical fluid flow controlling devices or to the faucet devices should all be cut off or switched off before the parts or elements of the typical fluid flow controlling devices of the faucet devices may be dismantled or removed or disengaged or separated from each other for fixing or repairing purposes.

The present invention has arisen to mitigate and/or obviate the afore-described disadvantages of the conventional water flow controlling devices for faucets.

SUMMARY OF THE INVENTION

The primary objective of the present invention is to provide a water flow controlling device for a faucet device and for automatically closing or shutting off a faucet device or for shutting off the water when an outer housing or receptacle of the faucet device is removed or disengaged or separated from the water mixing or controlling mechanism of the faucet device.

In accordance with one aspect of the invention, there is provided a water faucet device comprising a controlling mechanism including a bottom wall, a housing disposed on the bottom wall and having a compartment formed in the housing, and a casing disposed on the bottom wall and located beside and adjacent the housing and having a chamber formed in the casing, and having a passage formed and located between the housing and the casing for communicating the chamber of the casing and the compartment of the housing with each other, the casing including a valve seat formed or provided in the casing, a check valve device engaged in the chamber of the casing for engaging with the valve seat of the casing and for blocking and releasing the chamber of the casing and for controlling a water to flow out of the chamber of the casing, two pipes attached to the bottom wall for supplying cold and hot water into the compartment of the housing, a control device engaged in the compartment of the housing for controlling a mixing of the cold and the hot water, a receptacle including an outlet port, and including a chamber formed in the receptacle for receiving and engaging with the housing and the casing and the bottom wall of the controlling mechanism, and including a partition provided in the chamber of the receptacle for forming a space in the receptacle and for separating the space and the chamber of the receptacle from each other, and including a conduit provided in the receptacle and having a bore formed in the conduit and communicating with the chamber and the space of the receptacle, the space of the receptacle being communicating with the outlet port but spaced from the chamber of the receptacle with the partition, and an actuator tube attached to the conduit of the receptacle and including a lower portion extended out of the conduit of the receptacle, and including an actuating protrusion extended from the lower portion of the actuator tube and located within the chamber of the receptacle and engaged into the chamber of the casing and engaged with the check valve device for disengaging the check valve device from the valve seat of the casing and for opening or releasing the chamber of the casing and for allowing the water to flow out through the chamber of the casing and then to flow into the actuator tube, and the check valve device being engaged with the valve seat of the casing for blocking the chamber of the casing when the actuating protrusion of the actuator tube is disengaged from the casing and separated from the check valve device, and thus for allowing the parts or elements of the fluid flow controlling device of the water faucet device may be dismantled or removed or disengaged or separated from each other for fixing or repairing purposes without shutting off or switching off the cold and the hot water supplying pipes that are attached to the bottom wall of the housing.

The receptacle includes a second check valve device disposed and engaged into the conduit of the receptacle for controlling the water to flow through the conduit of the receptacle, and for limiting and guiding the water to flow only from the chamber of the receptacle into the space of the receptacle and then to flow out through the outlet port of the receptacle, and for preventing the water from flowing backward from the space into the chamber of the receptacle.

The controlling mechanism includes a pathway formed in the housing or in the casing, and an actuating mechanism includes a shaft engaged in the pathway of the casing or the housing for engaging with the control device and for controlling the control device to mix the cold and the hot water to the required or predetermined temperature. A knob may further be provided and attached to the shaft for actuating or operating the shaft relative to the housing or the casing.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 2 is another partial exploded view of the water flow controlling device for the faucet device or the like;

FIG. 3 is a partial cross sectional view of the water flow controlling device for the faucet device or the like;

FIGS. 4, 5 are partial cross sectional views similar to FIG. 3, illustrating the operation of the water flow controlling device for the faucet device or the like; and FIG. 6 is a further partial exploded view similar to FIG. 1, illustrating the other arrangement of the water flow controlling device for the faucet device or the like.

DETAILED DESCRIPTION OF THE PREFERRED EMBODIMENT

Figure 1:
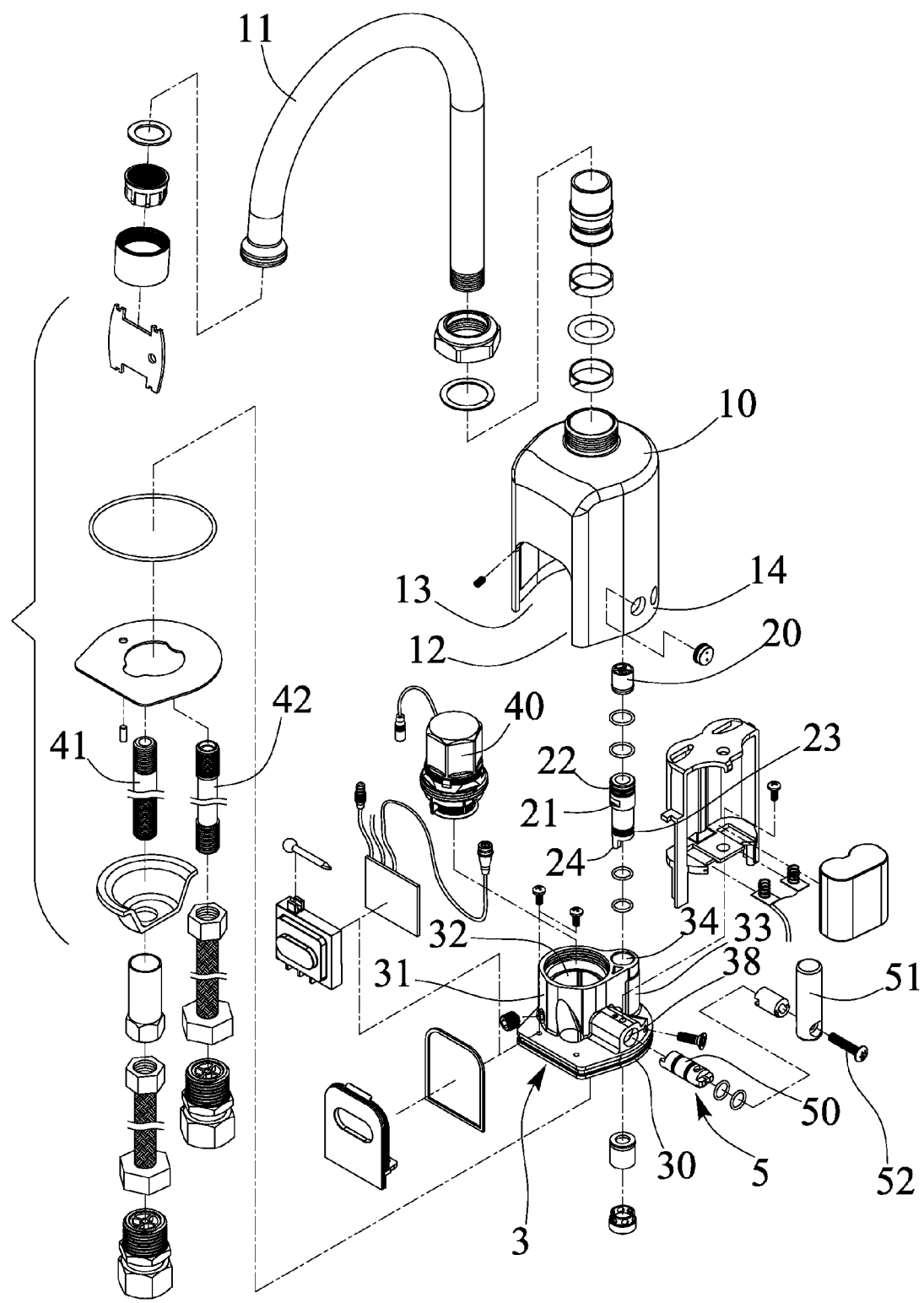
FIG. 1 is a partial exploded view illustrating a water flow controlling device for a faucet device in accordance with the present invention.
Figure 2:
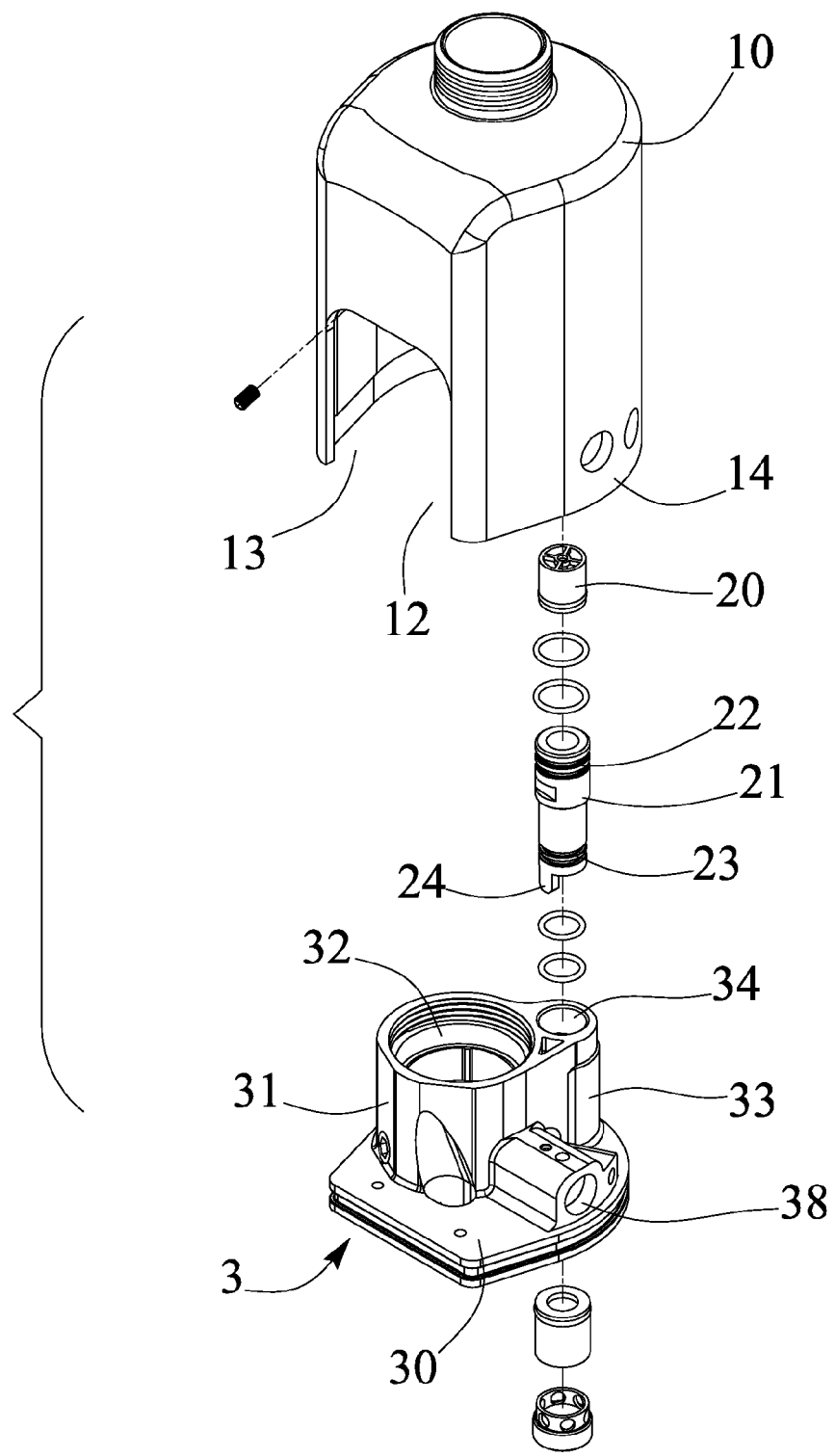
Figure 3:
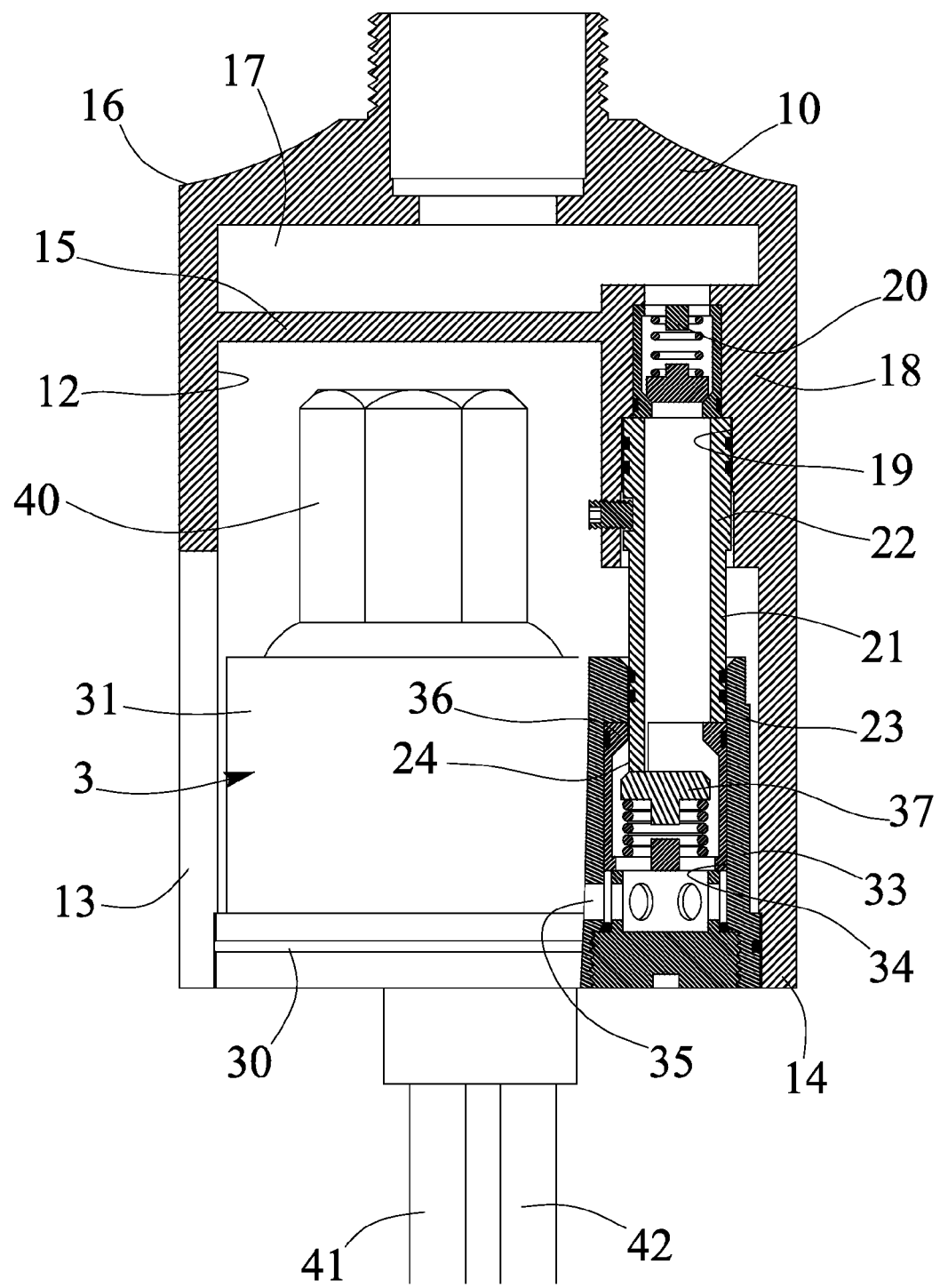

Referring to the drawings, and initially to FIGS. 1-3, a faucet device in accordance with the present invention is provided for attaching or mounting or securing to a sink, a basin (not illustrated) or the like, and more particularly to a supporting table or surface (not illustrated) of the sink or basin or the like, the faucet device 1 comprises an outlet piece or member or receptacle 10 for being attached or mounted or secured to the supporting table or surface of the sink or basin (not illustrated) or the like with latches or fasteners (not illustrated) or the like, and an outlet nozzle or port 11 disposed or attached or mounted or secured or supported on top of the receptacle 10 and directed toward the sink or basin for directing or delivering the water into the sink or basin or the like. The receptacle 10 includes a compartment or chamber 12 formed therein, and includes an opening 13 formed therein and communicating with the chamber 12 of the receptacle 10, and includes an opened lower or bottom portion 14.

Figure 4:
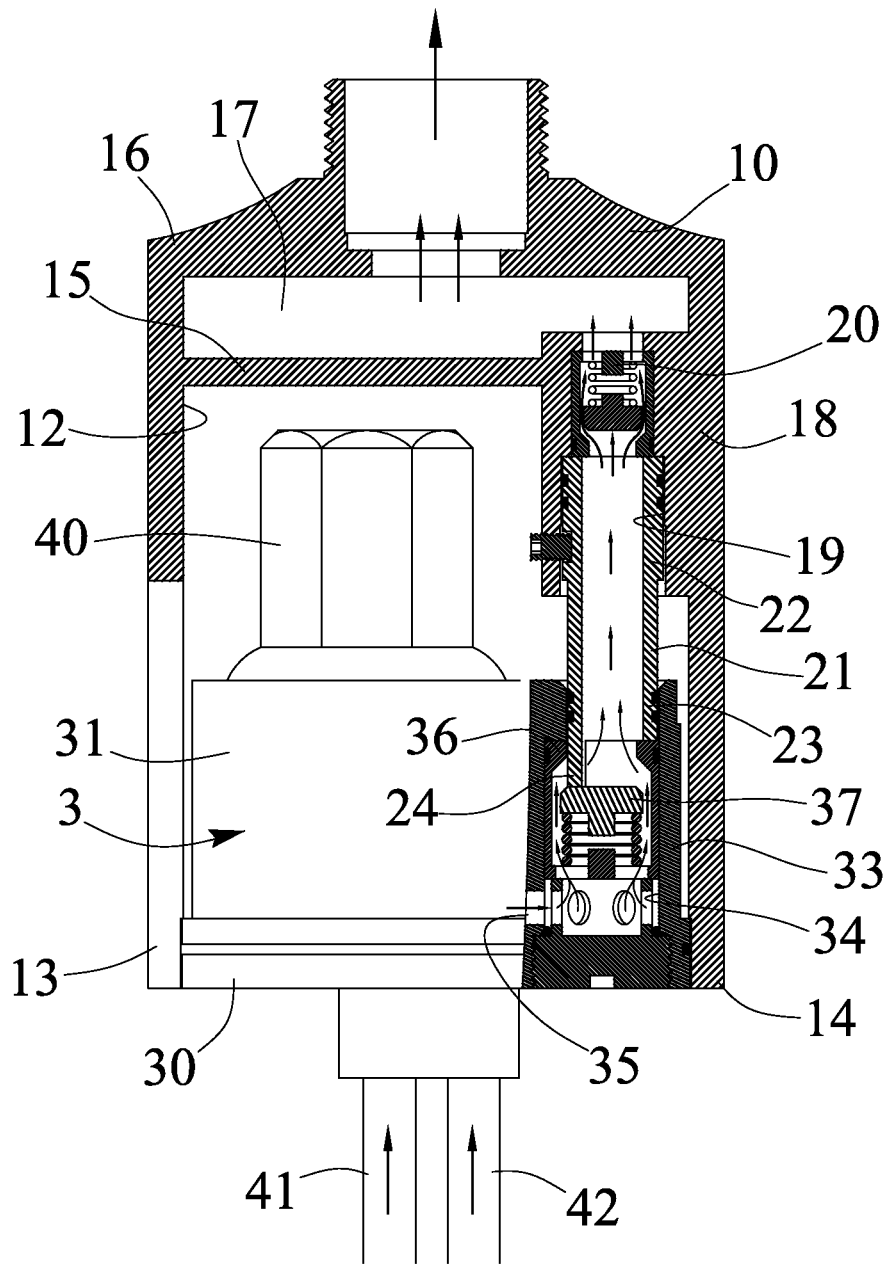
Figure 5:
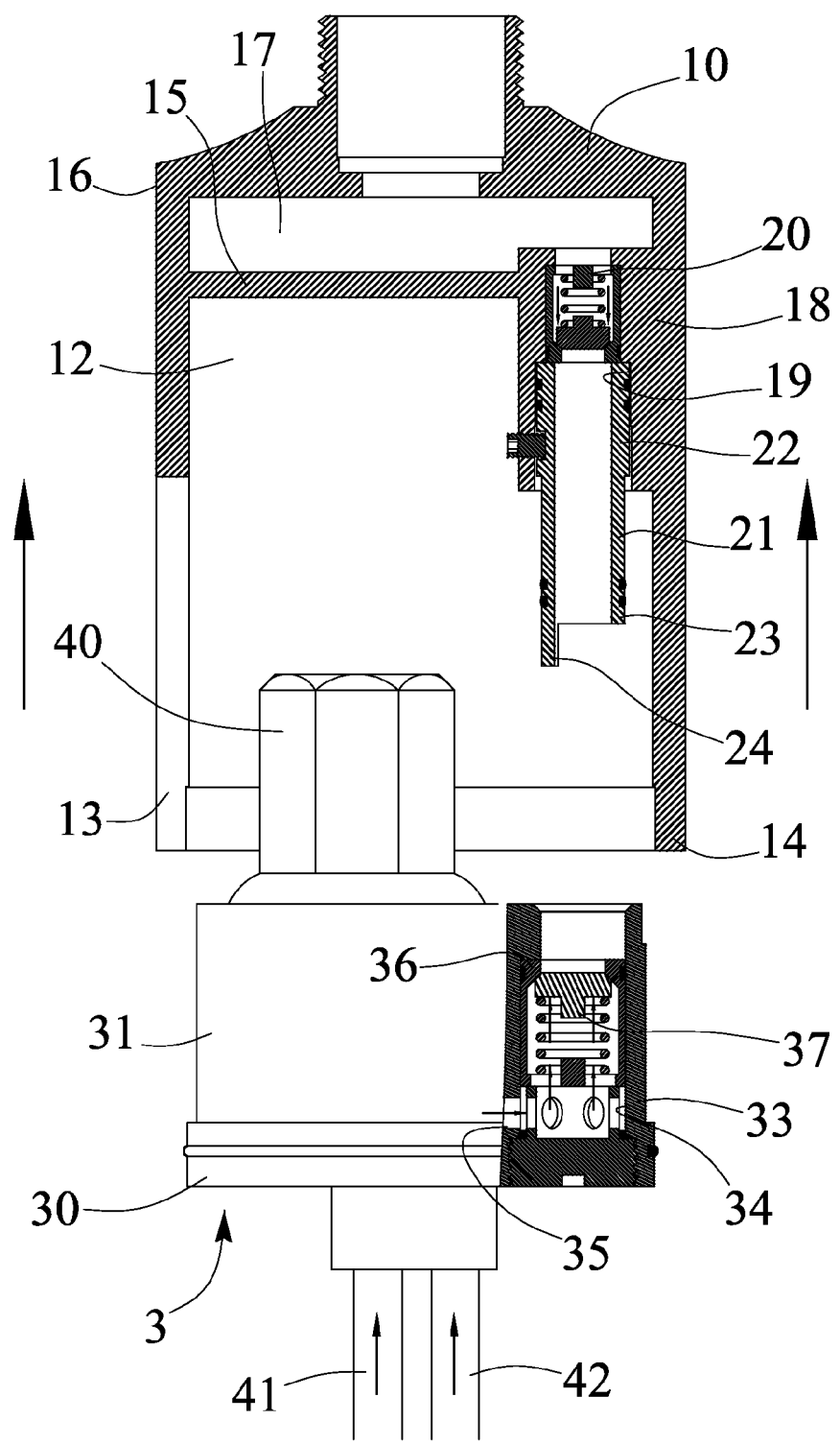

As shown in FIGS. 3-5, the receptacle 10 includes a plate or board or panel or partition 15 formed or provided in the upper portion 16 of the receptacle 10 for forming or defining the chamber 12 of the receptacle 10, and for forming or defining a compartment or chamber or space 17 in the upper portion 16 of the receptacle 10, in which the space 17 of the receptacle 10 is communicating with the outlet nozzle or port 11, but offset or spaced or separated from the chamber 12 of the receptacle 10 with the partition 15. The receptacle 10 further includes a bypass or duct or conduit 18 also formed or provided in the upper portion 16 of the receptacle 10, and the conduit 18 includes a bore 19 formed therein and communicating with the chamber 12 and the space 17 of the receptacle 10.

A spring biased check valve member or device 20 is disposed or attached or mounted or engaged in the bore 19 of the conduit 18 of the receptacle 10 for controlling the water to flow only from the chamber 12 of the receptacle 10 into the space 17 of the receptacle 10, and for preventing the water from flowing backward from the space 17 into the chamber 12 of the receptacle 10. An actuator tube 21 includes an upper portion 22 fitted or engaged into the bore 19 of the conduit 18 of the receptacle 10 and disposed or located below the check valve device 20, and includes a lower or bottom portion 23 extended downwardly and outwardly of the conduit 18 of the receptacle 10, and includes an actuating finger or limb or protrusion 24 further extended downwardly from the lower or bottom portion 23 of the actuator tube 21 and disposed or located within the chamber 12 of the receptacle 10.

A water mixing or flowing controlling assembly or device or mechanism 3 includes a lower plate or base portion or bottom wall 30 attached or mounted or secured to the receptacle 10, such as secured to the lower or bottom portion 14 of the receptacle 10 with latches or fasteners (not illustrated) or the like for sealing or enclosing or blocking the lower or bottom portion 14 of the chamber 12 of the receptacle 10, and includes a container or housing 31 disposed or provided or attached or mounted or secured or supported on top of the bottom wall 30, the housing 31 includes a chamber or compartment 32 formed therein for receiving or engaging with a control device 40, such as a control valve member or solenoid valve 40. One or more (such as two) hoses or tubes or pipes 41, 42 are attached or mounted or secured to the bottom wall 30 for supplying or delivering the cold and/or the hot water into the compartment 32 of the housing 31.

The solenoid valve or control valve member or control device 40 is provided for controlling the mixing of the cold and the hot water into the required temperature, and is typical and is not related to the present invention and will not be described in further details. The controlling mechanism 3 further includes another container or housing or casing 33 also disposed or provided or attached or mounted or secured or supported on top of the bottom wall 30 and disposed or located beside and adjacent the housing 31, the casing 33 includes a compartment or chamber 34 formed therein, and the controlling mechanism 3 includes a water flowing opening or aperture or orifice or channel or passage 35 formed therein and located between the compartment 32 of the housing 31 and the chamber 34 of the casing 33 for communicating the chamber 34 of the casing 33 with the compartment 32 of the housing 31, best shown in FIGS. 3-5.

The controlling mechanism 3 further includes a valve seat 36 formed or provided in the casing 33, and includes another spring biased check valve member or device 37 disposed or attached or mounted or engaged in the chamber 34 of the casing 33 for selectively engaging with the valve seat 36 of the casing 33 and for blocking or sealing or releasing the chamber 34 of the casing 33 and for controlling the water to flow only out of the chamber 34 of the casing 33, and also for controlling the water to flow from the chamber 12 of the receptacle 10 through the passage 35 of the housing 31 and into the chamber 34 of the casing 33, and for preventing the water from flowing backward from the outside of the casing 33 into the chamber 34 of the casing 33.

The controlling mechanism 3 further includes another duct or conduit or tube or pipe or orifice or aperture or pathway 38 (FIGS. 1, 2) laterally formed in the casing 33 and/or in the bottom wall 30, and communicating with the chamber 34 of the casing 33 for receiving or engaging with another controlling mechanism or manually operated actuating mechanism 5 which includes a rod or shank or shaft 50 pivotally or rotatably received or engaged in the pathway 38 of the casing 33 and/or of the bottom wall 30, the shaft 50 is engageable with the solenoid valve or control valve member or control device 40 for actuating or operating the control device 40 to control the operation or the mixing of the cold and the hot water into the required or selected temperature. A handle or hand grip or knob 51 may further be provided and attached or mounted or secured or coupled to the shaft 50 with a latch or fastener 52 for actuating or operating the shaft 50 to operate or actuate or control the control device 40.

As shown in FIGS. 3 and 4, when the housing 31 and the casing 33 and the bottom wall 30 of the controlling mechanism 3 are engaged into the chamber 12 of the receptacle 10 and attached or mounted or secured to the receptacle 10, the protrusion 24 of the actuator tube 21 is arranged to be engaged into the chamber 34 of the casing 33 and contacted or engaged with the spring biased check valve device 37 for disengaging or separating the spring biased check valve device 37 from the valve seat 36 of the casing 33 and for opening or releasing the chamber 34 of the casing 33 and for allowing the water to flow out through the chamber 34 of the casing 33 and then to flow into the actuator tube 21 and the space 17 of the receptacle 10, and then to flow out through the outlet nozzle or port 11.

When the faucet device in accordance with the present invention is required to be fixed or repaired, and when the solenoid valve or control valve member or control device 40 and/or the controlling mechanism 3 is damaged or is out of order, and when the controlling mechanism 3 and the control device 40 are required to be removed or disengaged or separated from the receptacle 10, or when the receptacle 10 is required to be removed or disengaged or separated from the controlling mechanism 3, the receptacle 10 may be directly removed or disengaged or separated from the controlling mechanism 3, and the protrusion 24 of the actuator tube 21 may also be removed or disengaged or separated from the spring biased check valve device 37 for allowing the spring biased check valve device 37 to engage with the valve seat 36 of the casing 33 and to block or seal the chamber 34 of the casing 33 and to prevent the water from flowing out of the chamber 34 of the casing 33.

Figure 6:
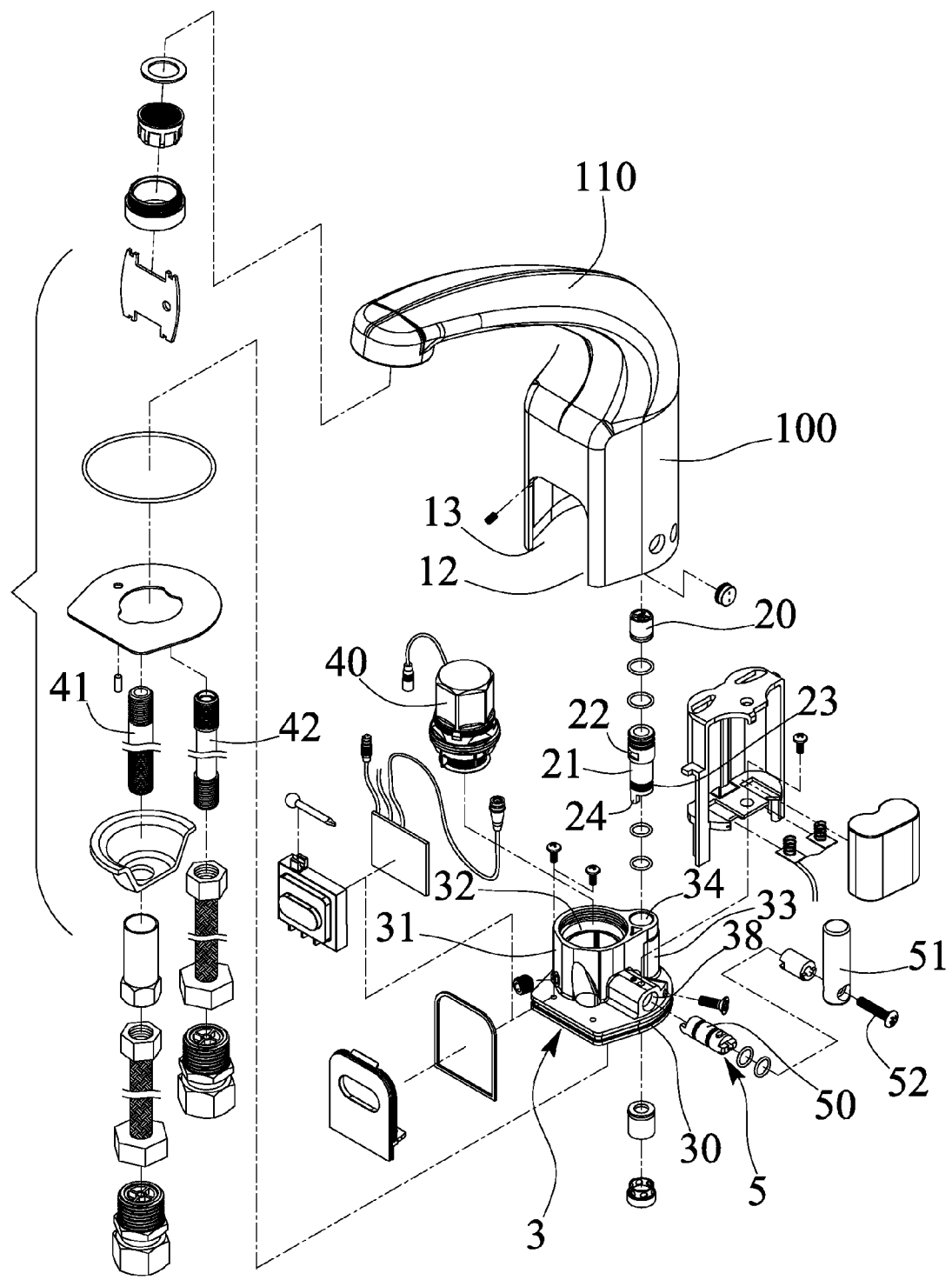

Alternatively, as shown in FIG. 6, the outlet nozzle or port 110 and the receptacle 100 may be formed integral as a one integral piece structure or configuration, and the receptacle 100 may also include a compartment or chamber 12 formed therein for receiving or engaging with the housing 31 and the casing 33 and the bottom wall 30 of the controlling mechanism 3, and the protrusion 24 of the actuator tube 21 may also be engaged into the chamber 34 of the casing 33 and engaged with the check valve device 37 for disengaging or separating the check valve device 37 from the valve seat 36 of the casing 33 and for opening or releasing the chamber 34 of the casing 33.

In operation, as shown in FIGS. 3 and 4, when the housing 31 and the casing 33 and the bottom wall 30 of the controlling mechanism 3 are engaged into the chamber 12 of the receptacle 10, the protrusion 24 of the actuator tube 21 may be engaged into the casing 33 and engaged with the check valve device 37 for disengaging the check valve device 37 from the valve seat 36 of the casing 33 and for releasing the chamber 34 of the casing 33 and for allowing the water to flow out through the chamber 34 of the casing 33. As shown in FIG. 5, when the controlling mechanism 3 is removed or disengaged or separated from the receptacle 10, or when the receptacle 10 is removed or disengaged or separated from the controlling mechanism 3, the protrusion 24 of the actuator tube 21 may be disengaged from the check valve device 37, and the spring valve device 37 may be engaged with the valve seat 36 of the casing 33 in order to block or seal the chamber 34 of the casing 33 and to prevent the water from flowing out of the chamber 34 of the casing 33, such that the water supplied or delivered to the pipes 41, 42 is not required to be shut off or switched off and such that the control device 40 and/or the controlling mechanism 3 of the faucet device may be easily and quickly and readily fixed or repaired without shutting or switching off the water supplied or delivered to the pipes 41, 42.

Accordingly, the water flow controlling device for a faucet device in accordance with the present invention may be provided for automatically closing or shutting off a faucet device or for shutting off the water when an outer housing or receptacle of the faucet device is removed or disengaged or separated from the water mixing or controlling mechanism of the faucet device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A water faucet device comprising:
   a controlling mechanism including a bottom wall, a housing disposed on said bottom wall and having a compartment formed in said housing, and a casing disposed on said bottom wall and located beside and adjacent said housing and having a chamber formed in said casing, and having a passage formed and located between said housing and said casing for communicating said chamber of said casing and said compartment of said housing with each other, said casing including a valve seat formed or provided in said casing,
   a check valve device engaged in said chamber of said casing for engaging with said valve seat of said casing and for blocking and releasing said chamber of said casing and for controlling a water to flow out of said chamber of said casing,
   two pipes attached to said bottom wall for supplying cold and hot water into said compartment of said housing,
   a control device engaged in said compartment of said housing for controlling a mixing of the cold and the hot water,
   a receptacle including an outlet port, and including a chamber formed in said receptacle for receiving and engaging with said housing and said casing and said bottom wall of said controlling mechanism, and including a partition provided in said chamber of said receptacle for forming a space in said receptacle and for separating said space and said chamber of said receptacle from each other, and including a conduit provided in said receptacle and having a bore formed in said conduit and communicating with said chamber and said space of said receptacle, said space of said receptacle being communicating with said outlet port but spaced from said chamber of said receptacle with said partition, and
   an actuator tube attached to said conduit of said receptacle and including a lower portion extended out of said conduit of said receptacle, and including an actuating protrusion extended from said lower portion of said actuator tube and located within said chamber of said receptacle and engaged into said chamber of said casing and engaged with said check valve device for disengaging said check valve device from said valve seat of said casing and for releasing said chamber of said casing and for allowing the water to flow out through said chamber of said casing and into said actuator tube, and said check valve device being engaged with said valve seat of said casing for blocking said chamber of said casing when said actuating protrusion of said actuator tube is disengaged from said casing and separated from said check valve device.

2. The water flow controlling device as claimed in claim 1, wherein said receptacle includes a second check valve device disposed and engaged into said conduit of said receptacle for controlling the water to flow only from said chamber into said space of said receptacle, and for preventing the water from flowing backward from said space into said chamber of said receptacle.

3. The water flow controlling device as claimed in claim 1, wherein said controlling mechanism includes a pathway formed in said casing, and an actuating mechanism includes a shaft engaged in said pathway of said casing for engaging with said control device.

4. The water flow controlling device as claimed in claim 3 further comprising a knob attached to said shaft.

* * * * *